US012682622B2

(12) United States Patent
Bondugula et al.

(10) Patent No.: US 12,682,622 B2
(45) Date of Patent: Jul. 14, 2026

(54) SELECTIVE KNOWLEDGE DISTILLATION

(71) Applicant: ObjectVideo Labs, LLC, Tysons, VA (US)

(72) Inventors: Sravanthi Bondugula, Vienna, VA (US); Gang Qian, McLean, VA (US); Lei Shi, Mountain View, CA (US); Allison Beach, Leesburg, VA (US)

(*) Notice: Subject to any disclaimer, the term of this patent is extended or adjusted under 35 U.S.C. 154(b) by 437 days.

(21) Appl. No.: 18/211,666

(22) Filed: Jun. 20, 2023

(65) Prior Publication Data

US 2024/0005648 A1      Jan. 4, 2024

Related U.S. Application Data

(60) Provisional application No. 63/356,510, filed on Jun. 29, 2022.

(51) Int. Cl.
*G06V 10/776* (2022.01)
*G06V 10/778* (2022.01)
*G06V 20/70* (2022.01)

(52) U.S. Cl.
CPC ........ *G06V 10/776* (2022.01); *G06V 10/7792* (2022.01); *G06V 20/70* (2022.01)

(58) Field of Classification Search
CPC ... G60V 10/776; G60V 10/7792; G06V 20/70
See application file for complete search history.

(56) References Cited

U.S. PATENT DOCUMENTS

| | | | | |
|---|---|---|---|---|
| 12,548,168 | B2 * | 2/2026 | Lee | G06T 7/20 |
| 2022/0180193 | A1 * | 6/2022 | Caine | G06N 3/0895 |
| 2023/0153943 | A1 * | 5/2023 | Kuen | G06V 10/751 |
| | | | | 382/100 |

(Continued)

FOREIGN PATENT DOCUMENTS

WO      WO-2018169708 A1 *   9/2018   ....... G06V 30/19167

OTHER PUBLICATIONS

Van Molle et al., Data-Efficient Sensor Upgrade Path Using Knowledge Distillation, 2021 (Year: 2021).*

(Continued)

*Primary Examiner* — Kevin Ky
(74) *Attorney, Agent, or Firm* — Fish & Richardson P.C.

(57) ABSTRACT
Methods, systems, and apparatus, including computer programs encoded on computer storage media, for updating a knowledge distillation training system. One of the methods includes: providing, to a teacher model in a knowledge distillation training system, first data representing an image to cause the teacher model to generate teacher output data that indicates whether the image depicts an object of interest; providing, to a student model in the knowledge distillation training system, second data representing the image to cause the student model to generate student output data that indicates whether the image depicts an object of interest; determining whether an accuracy of the teacher output data satisfies an accuracy threshold; and in response to determining that the accuracy of the teacher output data does not satisfy the accuracy threshold: determining to skip updating the student model; and updating the student model using the student output data and ground truth data.

20 Claims, 4 Drawing Sheets

(56) References Cited

U.S. PATENT DOCUMENTS

| | | | |
|---|---|---|---|
| 2023/0196067 A1* | 6/2023 | Wang | G06V 10/776 |
| | | | 706/20 |
| 2023/0206466 A1* | 6/2023 | Todoran | G06T 7/207 |
| | | | 382/103 |
| 2023/0298307 A1* | 9/2023 | Mao | G06V 10/751 |
| | | | 382/155 |
| 2023/0298330 A1* | 9/2023 | Chan | G06V 10/776 |
| | | | 382/159 |
| 2023/0316536 A1* | 10/2023 | Lee | G06T 3/02 |
| 2023/0401827 A1* | 12/2023 | Kuen | G06V 10/28 |
| 2024/0005648 A1* | 1/2024 | Bondugula | G06N 3/096 |
| 2024/0404004 A1* | 12/2024 | Kim | G06N 3/045 |
| 2025/0182436 A1* | 6/2025 | Wu | G06V 10/82 |
| 2026/0024363 A1* | 1/2026 | Qin | G06V 20/70 |

OTHER PUBLICATIONS

Ge et al., "OTA: Optimal Transport Assignment for Object Detection," CVPR 2021 paper, CVF Access, pp. 303-312.
Nguyen et al., "Improving Object Detection by Label Assignment Distillation," WACV 2022 paper, CVF Access, pp. 1005-1014.
Wikipedia, "Knowledge distillation," Mar. 30, 2021, https://en.wikipedia.org/w/index.php?title=Knowledge_distillation&oldid=10150751 76, 4 pages.

* cited by examiner

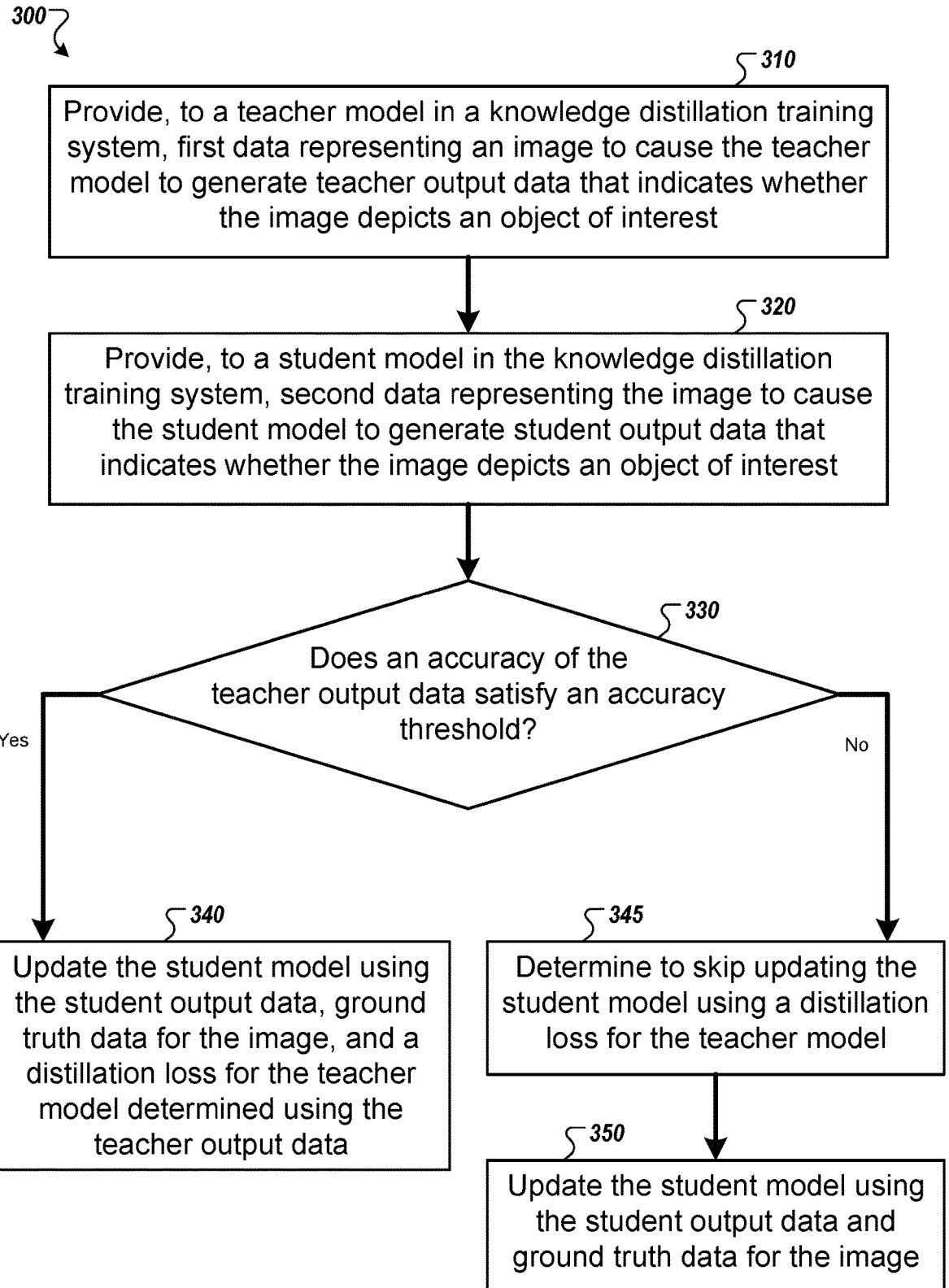

300

310

Provide, to a teacher model in a knowledge distillation training system, first data representing an image to cause the teacher model to generate teacher output data that indicates whether the image depicts an object of interest

320

Provide, to a student model in the knowledge distillation training system, second data representing the image to cause the student model to generate student output data that indicates whether the image depicts an object of interest

330

Does an accuracy of the teacher output data satisfy an accuracy threshold?

Yes

No

340

Update the student model using the student output data, ground truth data for the image, and a distillation loss for the teacher model determined using the teacher output data

345

Determine to skip updating the student model using a distillation loss for the teacher model

350

Update the student model using the student output data and ground truth data for the image

FIG. 3

SELECTIVE KNOWLEDGE DISTILLATION

CROSS-REFERENCE TO RELATED APPLICATION

This application claims the benefit of U.S. Provisional Application No. 63/356,510 filed Jun. 29, 2022, the contents of which are incorporated by reference herein.

BACKGROUND

Properties can be equipped with monitoring systems, e. g., security systems, that include sensors and connected system components. Some residential-based monitoring systems include cameras. Cameras can use computer vision technology to analyze images to detect objects depicted in the images.

SUMMARY

Some edge devices, such as cameras or drones, use machine learning to conduct intelligent video analytics. Because of the limited resources on these types of edge devices, these devices can struggle to support resource hungry, large deep learning models. To account for these limited resources, the edge devices can use knowledge distillation (KD). KD is the method of distilling information from a teacher model, e. g., a larger neural network model, to a student model, e. g., a smaller neural network, to improve the learning of the student model. In KD training, the student model is trained from not only human-labelled results, e. g., ground truth bounding boxes in object detection cases, but also from the intermediate features and soft outputs of the teacher model. KD has shown the ability to enhance the learning capacity of the small, student models.

To improve KD training, a KD training system can determine when to apply distillation loss to an image and its features within the training data set. Usually, KD involves applying distillation loss to all the training examples, regardless of whether the teacher model is predicting accurately for a given training image or not. In some cases, the teacher model producing inaccurate predictions can force the student model to learn from the false positives, leading to the student model to detect more false positives during runtime. For example, there can be some images for which the bounding box predictions are correct but not well localized, and the confidence of the prediction is low. In some examples, the predictions from the teacher model on the training set are false positives and incorrect predictions. When the bounding box predictions are not well localized, or the teacher model predicts are incorrect, training the student model using the output from the teacher model in these instances can reduce an accuracy of the student model.

To improve the accuracy of the student model trained with KD, the knowledge distillation system can perform "selective" KD. In some implementations, the selective KD is image-based (I-SKD). For I-SKD, the knowledge distillation system can select samples for which the teacher model's predictions satisfy an accuracy threshold to train the student model. The teacher model can train on all the images, but distillation loss can be applied to the student model only for selected images.

In some implementations, selective KD is prediction-based (P-SKD). A distinction between P-SKD and I-SKD is that the distillation loss is applied at the predicted feature level for P-SKD rather than at the image level as is done with I-SKD. For example, in P-SKD, the system can identify bounding boxes predictions made by the teacher model in a given image. Each of the bounding box predictions can have an accuracy that satisfies an accuracy threshold. If the model predicts an individual bounding box well, the system can use the well-predicted bounding box to train the student model even if the overall quality of the image prediction is low. One benefit of P-SKD is that the distillation loss can be applied to images excluded samples in I-SKD, and larger training data sets generally enhance machine learning.

In general, one aspect of the subject matter described in this specification can be embodied in methods that include the actions of: providing, to a teacher model in a knowledge distillation training system, first data representing an image to cause the teacher model to generate teacher output data that indicates whether the image depicts an object of interest; providing, to a student model in the knowledge distillation training system, second data representing the image to cause the student model to generate student output data that indicates whether the image depicts an object of interest; and determining whether an accuracy of the teacher output data satisfies an accuracy threshold. In response to determining that the accuracy of the teacher output data does not satisfy the accuracy threshold, the KD training system can: determine to skip updating the student model using a distillation loss for the teacher model; and update the student model using the student output data and ground truth data for the image. In response to determining that the accuracy of the teacher output data satisfies the accuracy threshold, the KD training system can update the student model using the student output data, ground truth data for the image, and a distillation loss for the teacher model determined using the second teacher output data.

In general, one aspect of the subject matter described in this specification can be embodied in methods that include the actions of: providing, to a teacher model in a knowledge distillation training system, first data representing an image to cause the teacher model to generate teacher output data that indicates whether the image depicts an object of interest; providing, to a student model in the knowledge distillation training system, second data representing the image to cause the student model to generate student output data that indicates whether the image depicts an object of interest; determining whether an accuracy of the teacher output data satisfies an accuracy threshold; and in response to determining that the accuracy of the teacher output data satisfies the accuracy threshold, updating the student model using the student output data, ground truth data for the image, and a distillation loss for the teacher model determined using the teacher output data.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the method can include: providing, to the teacher model in a knowledge distillation training system, third data representing a second image to cause the teacher model to generate second teacher output data that indicates whether the second image depicts an object of interest; providing, to the student model in the knowledge distillation training system, fourth data representing the second image to cause the student model to generate second student output data that indicates whether the second image depicts an object of interest; and determining whether a second accuracy of the second teacher output data satisfies the accuracy threshold. In response to determining that the second accuracy of the second teacher output data satisfies the accuracy threshold, the KD training system can update the student model using the second student output data, second ground truth data for the second image, and a second distillation loss for the teacher model determined using the second teacher output data.

In some implementations, the teacher output data can include data that represents each of a plurality of bounding boxes; determining whether the accuracy of the teacher output data satisfies the accuracy threshold can include determining, for each of the plurality of bounding boxes, whether a corresponding accuracy of a corresponding portion of the teacher output data that represents a bounding box of the plurality of bounding boxes satisfies the accuracy threshold; and determining to skip updating the student model can include determining, for the bounding box of the plurality of bounding boxes that have the corresponding accuracy that does not satisfy the accuracy threshold, to skip updating the student model using a corresponding distillation loss for the bounding box. The accuracy of a corresponding portion of the teacher output data can indicate an intersection over union of the corresponding portion with respect to ground truth data.

In some implementations, the method can include determining the accuracy of the teacher output data using the ground truth data for the image and the teacher output data.

In some implementations, the teacher output data and the student output data can include predicted labels and bounding box locations.

In some implementations, updating the student model using the student output data and ground truth data for the image can include: determining a cross entropy loss using the ground truth and the student output data; and updating the student model using the cross entropy loss.

In some implementations, the first data and second data can include different data. In some implementations, the first data and second data can include the same data.

In some implementations, the teacher model and the student model are object detection models.

In some implementations, determining whether the accuracy of the teacher output data satisfies the accuracy threshold can include: determining whether the accuracy for a first portion of the teacher output data satisfies the accuracy threshold; and determining whether a second accuracy for a second, different portion of the teacher output data satisfies the accuracy threshold. Determining to skip updating the student model using the distillation loss for the teacher model can include determining to skip updating the student model using a first distillation loss corresponding to the first portion of the teacher output data in response to determining that the accuracy for the first portion of the teacher output data does not satisfy the accuracy threshold. The method can include, in response to determining that the second accuracy satisfies the accuracy threshold, the KD training system can update the student model using the second, different portion of the student output data, second ground truth data for the second, different portion, and a second distillation loss for the teacher model determined using the second portion of the teacher output data.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. In some implementations, in a selective knowledge distillation training system, a student model can avoid learning from teacher output data, e. g., false positives or false negatives, to improve the accuracy of the student model. The selective knowledge distillation training system can determine to skip using some teacher output data, e. g., the false positives or false negatives, because that data can negatively impact the accuracy of student model predictions. In some implementations, selective knowledge distillation can reduce the demand on resources on a device by only deploying the smaller student model on the device. In some implementations, image-based selective knowledge distillation (I-SKD) can prevent a teacher model from sharing relatively low-quality predictions with a student model, which can lead to higher quality predictions from the student model.

In some implementations, prediction-based selective knowledge distillation can increase the amount of training data available to a student model. Since larger training data sets generally enhance the quality of machine learning predictions, an increased amount of training data can improve the accuracy of the student model. For example, using prediction-based selective knowledge distillation (P-SKD) allows the training system to use image features associated with accurate teacher output data in updating the student model even when other image features from the same image are associated with inaccurate teacher output data. If a training system discards all teacher output data associated with an image if some of the teacher output data is inaccurate, the training system cannot update the student model as often, which can reduce the learning capacity of the student model from the teacher model's predictions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of a selective knowledge distillation process.

Like reference numbers and designations in the various drawings indicate like elements.

DETAILED DESCRIPTION

Figure 1:
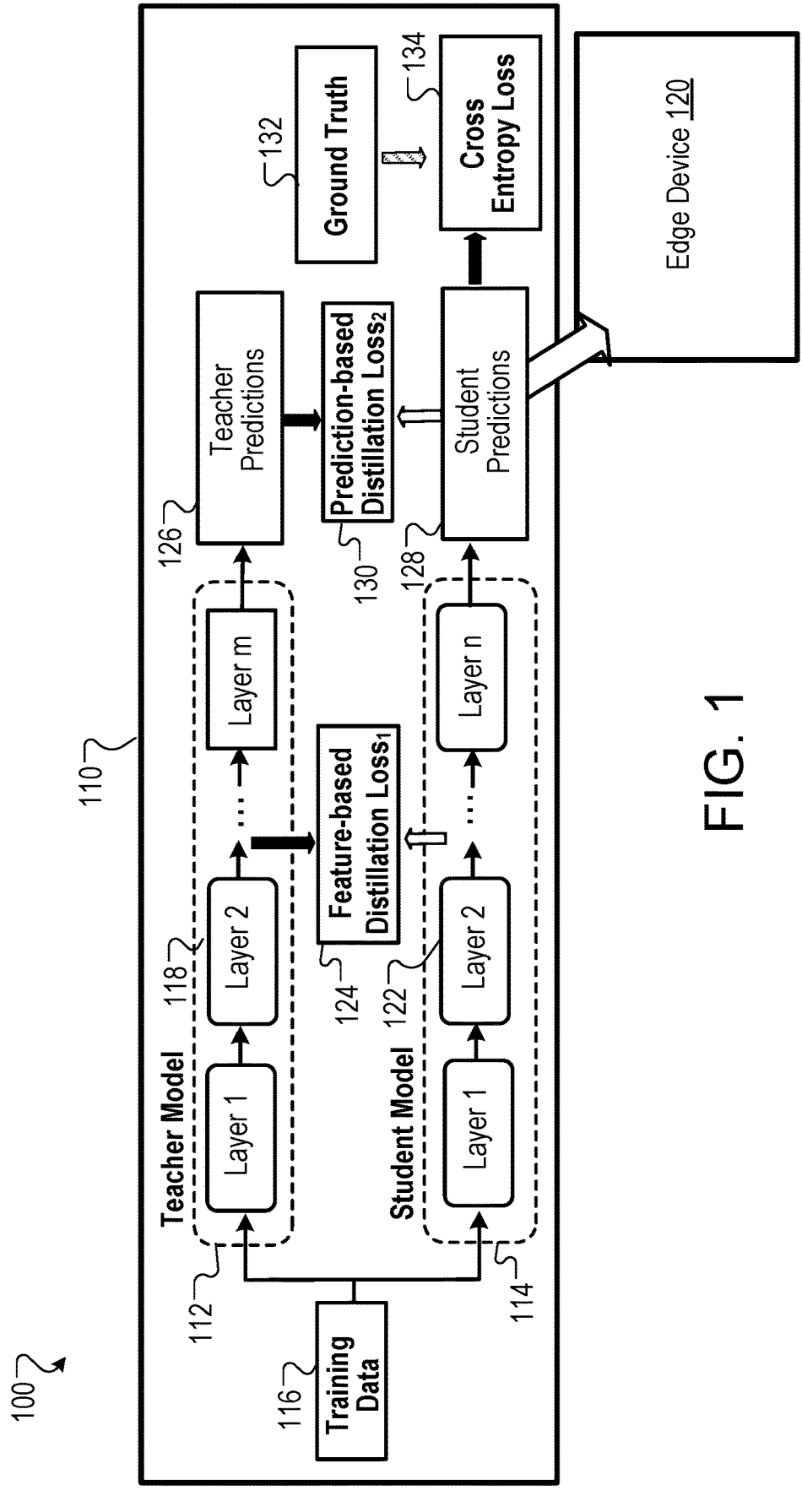
FIG. 1 shows an environment that includes a knowledge distillation (KD) system connected to an edge device.

FIG. 1 shows an environment 100 that includes a knowledge distillation (KD) training system 110 connected to an edge device 120. KD refers to the method of distilling knowledge from a teacher model 112 to a student model 114. Both the teacher model 112 and the student model 114 can receive training data 116. Each of the teacher model 112 and the student model 114 can have multiple layers 118 and 122, respectively. Generally, teacher model 112 is larger than the student model 114, e. g., the teacher model 112 has more nodes, more layers, or both, than the student model 114. The number of nodes in the model can be a function of the number of layers 118 and 122.

The student model 114 learns from intermediate features, soft outputs, or both, of the teacher model 112, as represented by the arrows pointing from the teacher model 112 to the student model 114. For example, the teacher model 112 can identify certain features, e. g., weights, in the teacher model 112 that have an accuracy that satisfies a feature accuracy threshold. These features can represent predictions for portions of an input image represented by training data 116. The portion of the input image can be a portion identified by a bounding box. As described in more detail below, the bounding box can identify an object of interest, e. g., for which the teacher model 112 and the student model 114 are being trained. The teacher model 112 can identify features that have accuracies that satisfy the feature accuracy threshold as part of a prediction-based selective knowledge distillation (P-SKD) or image-based selective knowledge (I-SKD) process. The teacher model 112 can provide data for those certain features with accuracies that satisfy the feature accuracy threshold to the student model 114 in the form of a loss function, e. g., feature-based distillation loss₁ 124. The KD training system can use the loss function, e. g., the feature-based distillation loss₁ 124, to update features in the student model 114. This updating can cause the student model 114 to have features that are similar to, or represent, the features from the teacher model 112; to more accurately predict soft outputs similar to those of the teacher model 112; or both.

When the teacher model 112 has features for which the corresponding accuracies do not satisfy the prediction accuracy threshold, the KD training system 110 can determine to skip updating the student model 114 using a feature-based distillation loss₁ 124 for the teacher model 112. As a result, the student model 114 will not likely be updated using the teacher model 112 producing soft outputs and feature predictions, e. g., predicted bounding boxes, with low prediction accuracies.

In some implementations, a portion of the teacher model 112 identified features can represent bounding boxes. Intersection over Union (IoU) is a type of measure for the quality of predictions involving the location, shape, and size of an area. For example, during training, the teacher model 112 can predict a bounding box that corresponds to a ground truth bounding box from the training data 116. Each of the predicted and ground truth bounding boxes can have their own respective lengths, widths, corner locations, centers, and the like. The IOU can measure how well the predicted and ground truth bounding boxes, e. g. a portion of the teacher output data and a portion of the ground truth data, agree. Specifically, the IOU value can be equal to the area of overlap of the predicted and ground truth bounding boxes divided by the total area of the predicted and ground truth bounding boxes when superimposed, giving a dimensionless fraction or percentage. In some implementations, the IOU can represent a prediction, an accuracy, or both. When the IOU is a prediction or an accuracy, a prediction threshold can represent an amount of overlap between the teacher output data and the ground truth data.

After both models process training data 116, e. g., the same training data 116 or training data that represents the same images, the teacher model 112 can produce teacher predictions 126, and the student model 114 can produce student predictions 128. The KD training system 110 can compare the student predictions 128 with the ground truth data 132. In some implementations, the ground truth data 132 includes data that humans or another system have verified as accurate predictions. For example, in categorization use cases, the ground truth data 132 can contain images with correct, verified labels. The KD training system 110 can determine a cross entropy loss 134 that measures how well the student predictions 128 compare with the ground truth data 132. Using the cross entropy loss 134, the KD training system 110 can adjust features, e. g., weights, of the student model 114 so that the student model 114 is more accurate.

In some implementations, the KD training system 110 can determine whether to update the student model 114 using teacher predictions 126, e. g., as part of an image-based selective knowledge distillation (I-SKD) or prediction-based selective knowledge (P-SKD) process. This analysis can be used to determine whether the KD training system 110 should update the student model 114 using the teacher predictions 126 for an entire image, e. g., instead of just a portion of the image as is done for P-SKD.

For instance, the KD training system 110 can determine whether a teacher prediction 126 satisfies a prediction accuracy threshold. If so, the KD training system 110 can compare the teacher predictions 126 and student predictions 128 to determine another loss function, e. g., an prediction-based distillation loss₂ 130. The prediction-based distillation loss₂ 130 can measure the difference in accuracies the teacher predictions 126 and the student predictions 128. The KD training system 110 can use the feature-based distillation loss 1₁ 124, the prediction-based distillation loss₂ 130, or both, to update the student model 114. For example, the KD training system 110 can update the student model 114 using the teacher prediction 126, e. g., teacher output data, and altering features, e. g., weights, in the student model 114 such that the accuracy of the teacher predictions 126 satisfies, e. g., is less than or greater than, a threshold value. While updating the student model 114, the KD training system 110 can also use the student output data, e. g., the student predictions 128, and ground truth data 132.

When the teacher prediction 126 does not satisfy the prediction accuracy threshold, the KD training system 110 can determine to skip updating the student model 114 using the feature-based distillation loss₁ 124. For instance, the KD training system 110 can determine to update the student model 114 using the student predictions 128 and the ground truth data 132.

Once the KD training system 110 completes training for the student model 114, e. g., the student model 114 has a parameter that satisfies a training threshold, the KD training system 110 can provide the student model 114 to an edge device. The parameter can be a number of training iterations, an accuracy of the student model 114, another training condition, or a combination of these.

The edge device 120 can receive the trained student model 114. A benefit of receiving the trained student model 114 compared to receiving the trained teacher model 112 can be that the trained student model 122 is smaller and consequently uses fewer resources from an edge device 120. In some implementations, the edge device 120 is a camera that uses a model to identify features in an image.

In some implementations, the training data 116 can include or otherwise represent images that include representations of humans or animals or both, bounding boxes associated with representations of humans, confidence scores of a bounding box being associated with a representation of the human, localization scores measuring how well the bounding box is centered on the representation of human, or a combination of two or more of these. For instance, the training data 116 provided to the teacher model 112 and the student model 114 can include representations of living creatures and bounding boxes. When the training data 116 includes the ground truth data 132, the training data 116 can include the confidence scores.

In selective KD, whether prediction based or image based, since the student model 114 can learn from the subset of features, a subset of teacher predictions 126, or both, the student model 114 can have features that generate more accurate predictions and, consequently, can generate more accurate predictions.

Figure 2C:
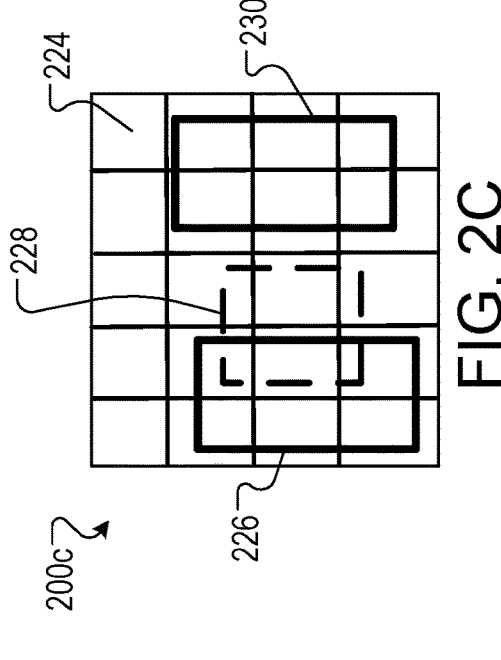
FIGS. 2A-C are example images used for selective knowledge distillation.
Figure 2A:
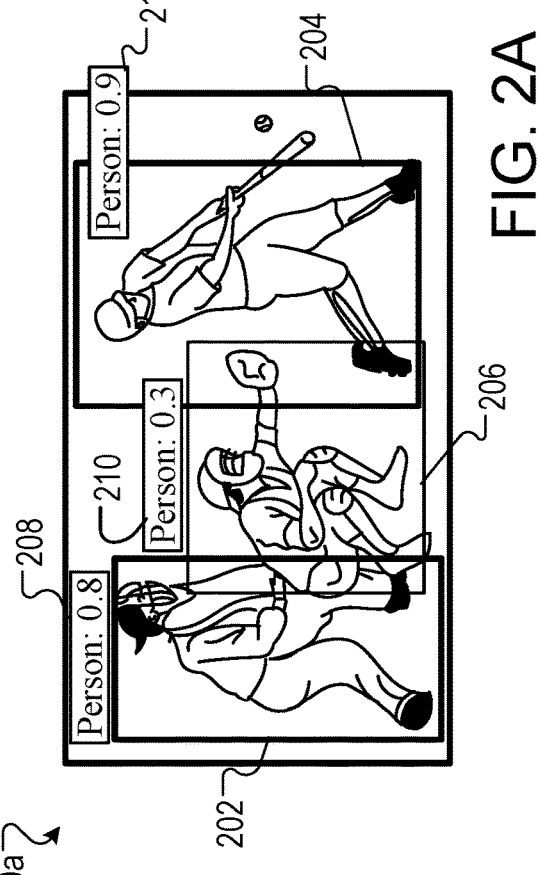
Figure 2B:
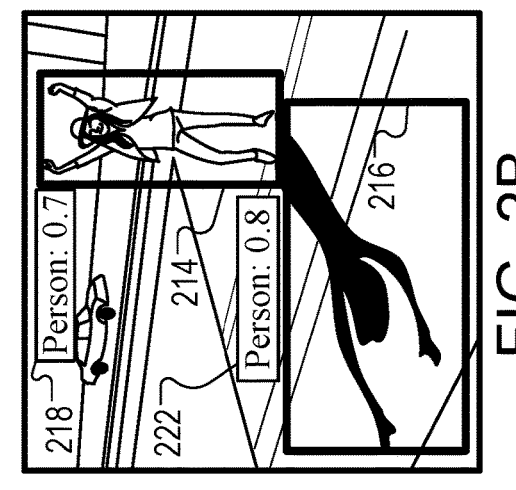

FIGS. 2A-C are example images used for selective knowledge distillation. FIG. 2A is an example image 200a with bounding boxes output by a teacher model 112. Bounding boxes can be an example of teacher output data. In this example, the purpose of the teacher model 112 and the student model 114 is to determine if an image 200a likely depicts an object of interest, e. g., a representation of a human or an animal. In some examples, the teacher model 112 and the student model 114 can determine a bounding box 202, 204, or 206 that contains the object of interest, e. g., the bounding box 202, 204, or 206 such that its dimensions are just large enough to encapsulate the object of interest. In some examples, the teacher model 112 and the student model 114 can center the bounding box 202, 204, or 206 on the object of interest, e. g., determine the bounding box 202, 204, or 206 such that its borders coincide with some of the extremities of the representation of the human.

In some implementations, the teacher model 112, the student model 114, or both, can determine a confidence score 208, 210, or 212 for one or more of the bounding boxes 202, 204, or 206, respectively. For instance, a model can determine a confidence score 208, 210, or 212, e. g., 0.8, 0.3 or 0.9, which measures the confidence the model has that the bounding box 202, 204, or 206 contains a representation of human. In some implementations, the confidence scores 208, 210, and 212 can range from 0 to 1, with a higher score indicating a higher confidence. Other implementations are possible, e. g., different ranges, non-numerical scores, or lower values of scores indicating a higher confidence.

In some implementations, the teacher model 112 can successfully identify the presence of a representation of the human but not center the bounding box well. FIG. 2A contains three bounding boxes 202, 204, or 206, each associated with the representation of the human. Bounding boxes 202 and 204 have relatively high, e. g., greater than 0.5, confidence scores 208 and 212. However, the confidence score 210 is relatively low, e. g., less than 0.5, even though the corresponding bounding box 206 contains a human. Further, the bounding box 206 does not encapsulate both legs of the representation of a human nor does it end at the representation of the human's extremity wearing a baseball glove. As a result, if the KD training system 110 trained the student model 114 on the teacher output data for the image 200a, the student model 114 would be trained on some of the inaccuracies for the bounding boxes 202 and 206.

To account for this, the KD training system 110 can use one or more accuracies for the image 200a when determining how to train the student model 114. An accuracy can quantify the quality of the teacher output data. For example, in image-based SKD (I-SKD), the KD training system 110 can calculate an accuracy at the image level, e. g., an image accuracy for the image 200a. The image accuracy can be a function, e. g., a weighted average, of the confidence scores associated with each bounding box in an image 200a. For example, the image accuracy of the image 200a in FIG. 2A can be the average of the confidence scores 208, 210, and 212, e. g., 0.67. In some implementations, the image accuracy is a function of the size of each bounding box in an image 200a. In some implementations, the image accuracy can account for whether any of the bounding boxes overlap, extend beyond the boundaries of the image 200a, or both. In some implementations, the image accuracy is the measure of mean Average Prediction (mAP) calculated between the predicted bounding boxes and ground truth.

In I-SKD, the KD training system 110 can determine if the image accuracy of the teacher output data, e. g., teacher predictions 126, satisfies an image accuracy threshold when determining if the KD training system 110 should update the student model. For example, the image accuracy of the image 200a in FIG. 2A, e. g., 0.67, might satisfy, e. g., be greater than, an image accuracy threshold, e. g, 0.5. Consequently, the KD training system 110 can update the student model 114 using the student output data, ground truth data for the image 200a, and the distillation loss for the teacher model 112 determined using only the teacher output data that satisfied an image accuracy threshold, e. g., 0.5, 0.75, or some other measure.

While an image 200a might have some teacher output data with low confidence scores, the image 200a might contain other teacher output data with high confidence scores. Qualitatively, the image accuracy can measure whether or not a student model 114 would benefit from learning the teacher output data associated with an image 200a. This can enable the KD training system 110 to train the student model 114 using the teacher output data that is sufficiently accurate, given the accuracy threshold, while not training the student model 114 when the teacher output data is insufficiently accurate.

FIG. 2B is another example image 200b with bounding boxes output by a teacher model. In this image 200b, the teacher model 112 outputs bounding boxes 214 and 216, with respective confidence scores 218 and 222. The teacher model 112 determines a confidence score 218, e. g., 0.7, for the bounding box 214. However, for the bounding box 216 that contains a shadow of the representation of the human rather than an actual representation of the human, and the teacher model 112 determines confidence score 222, e. g., 0.8. Given that the bounding box 216 is for a shadow, the teacher model 112 determined a false positive for that bounding box 216 as indicated by the confidence score 222 that satisfies a threshold.

In this example, the teacher model 112 incorrectly detected the presence of a representation of a human. For instance, the teacher model 112 can assign a high confidence score to a bounding box even when the bounding box does not actually contain a representation of a human. Consequently, the teacher model 112 can create output that negatively impacts the ability of the student model 114 to make predictions, e. g., that can reduce an accuracy of the student model 114.

In prediction-based SKD (P-SKD), another type of accuracy can quantify the quality of the teacher output data at the feature, e. g., bounding box, level, instead of at the image level. For example, in FIG. 2B, the teacher output data can include data that represents multiple bounding boxes 214 and 216. A corresponding prediction accuracy of a corresponding portion of the teacher output data can represent each bounding box 214 and 216. In some implementations, the KD training system 110 can determine whether each corresponding prediction accuracy satisfies a prediction accuracy threshold. For example, the KD training system 110 might determine that the accuracy corresponding to a portion of the teacher output data that represents bounding box 214 satisfies a prediction accuracy threshold, while that of bounding box 216 does not satisfy the prediction accuracy threshold. Although some of the features, e. g., bounding box 216, do not satisfy the prediction accuracy threshold and the overall image accuracy might not satisfy an image accuracy threshold as a result, the student model 114 can still learn from individual features, e. g., bounding box 214, that do satisfy a prediction accuracy threshold.

FIG. 2C is a schematic of bounding boxes associated with different regions of an image 200c. An image 200c can be composed of multiple cells 224 arranged in a grid. The use of the grid can help represent how each bounding box 226, 228, and 230 is associated with a region of the image 200c composed of cells 224. Each bounding box is in at least one region, made up either of entire cells 224 or portions of cells 224. Each region covered by bounding boxes 226, 228, and 230 can include features that have a corresponding prediction accuracy. As indicated by the use of solid or dashed lines, bounding boxes 226 and 230 satisfy a prediction accuracy threshold, while bounding box 228 does not. In some implementations, the KD training system 110 will only train the student model 114 on features that satisfy a prediction accuracy threshold, e. g., bounding boxes 226 and 230. In practice, the KD training system 110 can apply feature-based distillation loss₁ 124 for only the features that satisfy a prediction accuracy threshold. In P-SKD, the feature-based distillation loss₁ 124 and regions of the image 200c with strong prediction accuracies can be correlated.

In some implementations, bounding boxes can overlap, as bounding boxes 226 and 228 do in FIG. 2C. Although a bounding box can cover more than one cell, the origin of the feature it represents can be located within one cell. Because of this, in some implementations, each bounding box 226, 228, and 230 is associated with one cell 224, e. g., the cell that contains the origin of the feature the bounding box represents. Consequently, even if two bounding boxes overlap and only one has a prediction accuracy that satisfies the prediction accuracy threshold, the KD training system 110 can use the region, e. g., cell, associated with the bounding box with a prediction accuracy that satisfies the prediction accuracy threshold in training the student model 114.

Returning to FIG. 1, in prediction-based selective KD (P-SKD), the KD training system 110 can determine if the accuracies corresponding to a portion of the teacher output data satisfies a prediction accuracy threshold when determining if the KD training system 110 should update the student model. Consequently, in prediction-based selective KD, only features from regions of the image 200c that produce accurate predictions contribute to updating the student model 114.

Prediction-based selective KD can beneficially lead the student model 114 having more teacher output data from which to learn. For example, image 200c contains a bounding box 228 that can reduce the image accuracy, and the KD training system 110 can determine to not update student model 114, even though the image 200c contains bounding boxes 226 and 230 with relatively high accuracy scores. However, in prediction-based selective KD, the KD training system 110 can allow the student model 114 to learn from bounding boxes 226 and 230, while ignoring bounding box 228.

The edge devices 120 can include cameras, video recorders, personal computers, mobile communication devices, and other devices that can send and receive data over the network. In some examples, the KD training system 110 can communicate with devices other than edge devices 120. The network, such as a local area network ("LAN"), wide area network ("WAN"), the Internet, or a combination thereof, connects the edge devices 120 and the servers.

The KD training system 110 is an example of a system implemented as computer programs on one or more computers in one or more locations, in which the systems, components, and techniques described in this specification are implemented. The KD training system 110 can use a single server computer or multiple server computers operating in conjunction with one another, including, for example, a set of remote computers deployed as a cloud computing service.

The KD training system 110 can include several different functional components, including an edge device 120 and a computer. The edge device 120, the computer, or a combination of these, can include one or more data processing apparatuses, can be implemented in code, or a combination of both. For instance, each of the edge device 120 and the computer can include one or more data processors and instructions that cause the one or more data processors to perform the operations discussed herein.

The various functional components of the KD training system 110 can be installed on one or more computers as separate functional components or as different modules of a same functional component. For example, the edge device 120 and the computer of the KD training system 110 can be implemented as computer programs installed on one or more computers in one or more locations that are coupled to each through a network. In cloud-based systems for example, these components can be implemented by individual computing nodes of a distributed computing system.

FIG. 3 is a flow diagram of an example process 300 for training a selective KD model. For example, the process 300 can be used by the KD training system 110 from the object detection environment 100.

The KD training system 110 can provide, to a teacher model 112 in the KD training system 110, first data representing an image to cause the teacher model 112 to generate teacher output data that indicates whether the image depicts an object of interest (310). In some implementations, the teacher model 112 and the student model 114 are object detection models. In some implementations, the teacher output data includes confidence scores, represents a teacher prediction, or both. In some implementations, the teacher output data includes data that represents each of a plurality of bounding boxes.

The KD training system 110 can provide, to a student model 114 in the KD training system 110, second data representing the image to cause the student model 114 to generate student output data that indicates whether the image depicts an object of interest (320). In some implementations, the first and second data representing an image are the same, e. g., the same vectors. In some implementations, the first and second data representing an image are the different, e. g., different vectors. In some implementations, some of the first and second data representing an image is the same, e. g., the student model 114 receives only a subset of the data that the teacher model 112 receives.

The KD training system 110 can determine whether an accuracy of the teacher output data satisfies an accuracy threshold (330). In some implementations, the accuracy is an image accuracy, a predication accuracy, or both. The KD training system 110 can use both accuracies when determining which of the two selective knowledge distillation processes to use or whether to use both processes. In some implementations, the accuracy corresponds to a portion of the teacher output data that represents the bounding box. In some implementations, there are multiple types of accuracies. In some implementations, the KD training system 110 can determine the accuracy using the ground truth data 132 and the teacher output data.

In response to determining that the accuracy of the teacher output data satisfies an accuracy threshold, the KD training system 110 can update the student model 114 using the student output data, ground truth data 132 for the image, and a distillation loss (340). The distillation loss can be a feature-based distillation $loss_1$ 124, a prediction-based distillation $loss_2$ 130, or both, for the teacher model 112 determined using the teacher output data.

In response to determining that the accuracy of the teacher output data does not satisfy an accuracy threshold, the KD training system 110 can determine to skip updating the student model using a distillation loss (345). The distillation loss can be a feature-based distillation $loss_1$ 124, a prediction-based distillation $loss_2$ 130, or both, for the teacher model. In some implementations, determining to skip updating the student model 114 includes determining, for each bounding box or image that has a corresponding accuracy that does not satisfy the accuracy threshold, to skip updating the student model 114 using a corresponding distillation loss for each bounding box.

The KD training system 110 can update the student model 114 using the student output data and ground truth data 132 for the image (350). The KD training system 110 can perform this step in response to determining that the accuracy of the teacher output data does not satisfy an accuracy threshold. In some implementations, updating the student model 114 can include determining a cross entropy loss 134 using the ground truth data 132 and the student output data and updating the student model 114 using the cross entropy loss 134.

The order of steps in the process 300 described above is illustrative only, and training a selective KD model can be performed in different orders. For example, step 320 may occur before, after, or at substantially the same time as step 310.

The KD training system 110 can be distributed across multiple processors, computers, or both, so the KD training system 110 can determine whether multiple teacher output data sets satisfy an accuracy threshold at substantially the same time. Consequently, steps 340 and step 345 followed by step 350 can occur in parallel or in series.

In some implementations, the process 300 can include additional steps, fewer steps, or some of the steps can be divided into multiple steps. In some implementations, the KD training system 110 can repeat one or more steps in the process 300 until a training threshold for the student model is satisfied. For example, additional training can occur if, after step 310, the teacher model 112 initially does not predict many false positives or has bounding box detections with relatively low confidence scores, e. g., less than 0.5. In some implementations, after step 310, the KD training system 110 can provide, to a teacher model 112 in the KD training system 110, additional data representing a background image, which can improve the accuracy of the teacher model 112. In some examples, the process 300 can include steps 310, 320, 330, and 340 without the other steps. In some examples, the process 300 can include steps 310, 330, and 345; optionally with either or both of steps 320 or 350; and without step 340. In some examples, the process 300 can include steps 310, 330, and 340 without the other steps in the process 300.

Figure 4:
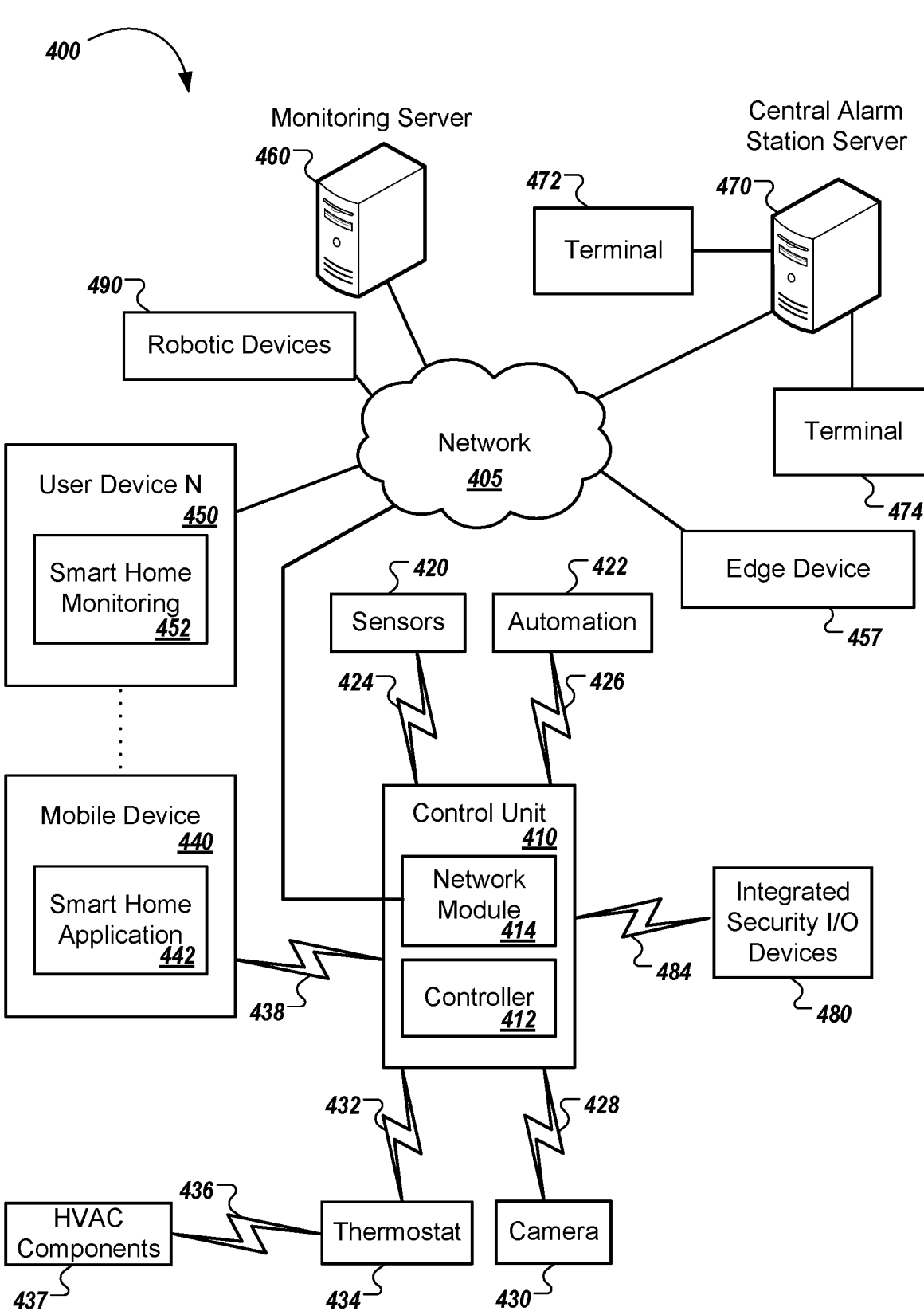
FIG. 4 is a diagram illustrating an example of a home monitoring system.

FIG. 4 is a diagram illustrating an example of a home monitoring system 400. The home monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e. g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e. g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e. g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e. g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e. g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e. g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area or video images of the area in which multiple images of the area are captured at a relatively high frequency (e. g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e. g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e. g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e. g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e. g., temperature) settings. In some implementations, the thermostat 434 can additionally or alternatively receive data relating to activity at a home and/or environmental data at a home, e. g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e. g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e. g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes an edge device 457. The edge device 457 can be a camera, video recorder, computing devices (e. g., a computer, microcontroller, FPGA, ASIC, or other device capable of electronic computation) capable of receiving data related to selective knowledge distillation and communicating electronically with the monitoring system control unit 410.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e. g., quad copters), rolling helicopter type devices (e. g., roller copter devices that can fly and also roll along the ground, walls, or ceiling) and land vehicle type devices (e. g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e. g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e. g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e. g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zig-Bee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the home monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the home monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e. g., using low-power Wi-Fi chipsets), Z-Wave, ZigBee, Bluetooth, "HomePlug" or other "Power-line" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e. g., alarm events) generated by the control unit 410. In this example, the monitoring server 460 may exchange electronic communications with the network module 414 included in the control unit 410 to receive information regarding events (e. g., alerts) detected by the control unit 410. The monitoring server 460 also may receive information regarding events (e. g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system 400 and perform analysis of sensor and image data received from the monitoring system 400. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the home automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e. g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e. g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e. g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e. g., as provided by Research in Motion), electronic organizers, iPhone-type devices (e. g., as provided by Apple), iPod devices (e. g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e. g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e. g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e. g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e. g., through communication link 438) or through the monitoring server 460 (e. g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e. g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the edge device 457. The one or more user devices 440 and 450 receive data directly from the sensors 420, the home automation controls 422, the camera 430, the robotic devices 490, and the edge device 457 and sends data directly to the sensors 420, the home automation controls 422, the camera 430, the robotic devices 490, and the edge device 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the edge device 457 are configured to communicate sensor and image data to the one or more user devices 440 and 450 over network 405 (e. g., the Internet, cellular network, etc.). In yet another implementation, the sensors 420, the home automation controls 422, the camera 430, the thermostat 434, the robotic devices 490, and the edge device 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the edge device 457 to a pathway over network 405 when the one or more user devices 440 and 450 are farther from the sensors 420, the home automation controls 422, the camera 430, the thermostat 434, the robotic devices 490, and the edge device 457. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the edge device 457 to use the direct local pathway or whether the one or more user devices 440 and 450 are far enough from the sensors 420, the home automation controls 422, the camera 430, the thermostat 434, the robotic devices 490, and the edge device 457 that the pathway over network 405 is required. In other examples, the system leverages status communications (e. g., pinging) between the one or more user devices 440 and 450 and the sensors 420, the home automation controls 422, the camera 430, the thermostat 434, the robotic devices 490, and the edge device 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the edge device 457 using the direct local pathway. If communication using the direct local pathway is not possible, the one or more user devices 440 and 450 communicate with the sensors 420, the home automation controls 422, the camera 430, the thermostat 434, the robotic devices 490, and the edge device 457 using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e. g., compressing data, down-sampling data, sending data only over inexpensive LAN connections, or other techniques).

In some implementations, a state of the monitoring system 400 and other events sensed by the monitoring system 400 may be used to enable/disable video/image recording devices (e. g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
providing, to a teacher model in a knowledge distillation training system, first data representing an image to cause the teacher model to generate teacher output data, the teacher output data comprising (i) features of the teacher model and (ii) predictions that indicate whether the image depicts an object of interest;
providing, to a student model in the knowledge distillation training system, second data representing the image to cause the student model to generate student output data that indicate whether the image depicts an object of interest;
determining whether an accuracy of the teacher output data satisfies an accuracy threshold; and
in response to determining that the accuracy of the teacher output data does not satisfy the accuracy threshold:
determining to skip updating the student model using a feature-based distillation loss for the teacher model, the feature-based distillation loss determined based on the features of the teacher model; and
updating the student model using the student output data and ground truth data for the image.

2. The method of claim 1, comprising:
providing, to the teacher model in a knowledge distillation training system, third data representing a second image to cause the teacher model to generate second teacher output data, the second teacher output data comprising (i) second features of the teacher model and (ii) second predictions that indicate whether the second image depicts an object of interest;
providing, to the student model in the knowledge distillation training system, fourth data representing the second image to cause the student model to generate second student output data that indicates whether the second image depicts an object of interest;
determining whether a second accuracy of the second teacher output data satisfies the accuracy threshold; and
in response to determining that the second accuracy of the second teacher output data satisfies the accuracy threshold, updating the student model using the second student output data, second ground truth data for the second image, and a second feature-based distillation loss for the teacher model determined using the second teacher output data, the second feature-based distillation loss determined based on the second features of the teacher model.

3. The method of claim 1, wherein:
the features of the teacher output data comprise data that represents each of a plurality of bounding boxes;
determining whether the accuracy of the teacher output data satisfies the accuracy threshold comprises determining, for each of the plurality of bounding boxes, whether a corresponding accuracy of a corresponding portion of the teacher output data that represents a bounding box of the plurality of bounding boxes satisfies the accuracy threshold; and
determining to skip updating the student model comprises determining, for the bounding box of the plurality of bounding boxes that have the corresponding accuracy that does not satisfy the accuracy threshold, to skip updating the student model using a corresponding distillation loss for the bounding box.

4. The method of claim 1, comprising determining the accuracy of the teacher output data using the ground truth data for the image and the teacher output data.

5. The method of claim 1, wherein the predictions of the teacher output data and the student output data comprise predicted labels and bounding box locations.

6. The method of claim 1, wherein updating the student model using the student output data and ground truth data for the image comprises:
determining a cross entropy loss using the ground truth and the student output data; and
updating the student model using the cross entropy loss.

7. The method of claim 1, wherein the first data and second data comprise different data.

8. The method of claim 1, wherein the first data and second data comprise the same data.

9. The method of claim 1, wherein the teacher model and the student model are object detection models.

10. The method of claim 1, wherein:
determining whether the accuracy of the teacher output data satisfies the accuracy threshold comprises:
determining whether the accuracy for a first portion of the teacher output data satisfies the accuracy threshold; and
determining whether a second accuracy for a second, different portion of the teacher output data satisfies the accuracy threshold; and
determining to skip updating the student model using the feature-based distillation loss for the teacher model comprises determining to skip updating the student model using a first feature-based distillation loss corresponding to the first portion of the features of the teacher output data in response to determining that the accuracy for the first portion of the features of the teacher output data does not satisfy the accuracy threshold, and wherein the method comprises:

in response to determining that the second accuracy satisfies the accuracy threshold, updating the student model using the second, different portion of the student output data, second ground truth data for the second, different portion, and a second feature-based distillation loss for the teacher model determined using the second portion of the features of the teacher output data.

11. The computer-implemented method of claim 1, wherein the features of the teacher model comprise one or more of a weight of the teacher model, a bounding box associated with an image from the first data, or an identified portion of an image from the first data.

12. A system comprising one or more computers and one or more storage devices on which are stored instructions that are operable, when executed by the one or more computers, to cause the one or more computers to perform operations comprising:

providing, to a teacher model in a knowledge distillation training system, first data representing an image to cause the teacher model to generate teacher output data, the teacher output data comprising (i) features of the teacher model and (ii) predictions that indicate whether the image depicts an object of interest;

providing, to a student model in the knowledge distillation training system, second data representing the image to cause the student model to generate student output data, the student output data comprising (i) features of the student model and (ii) predictions that indicate whether the image depicts an object of interest;

determining whether an accuracy of the teacher output data satisfies an accuracy threshold; and in response to determining that the accuracy of the teacher output data does not satisfy the accuracy threshold:

determining to skip updating the student model using a feature-based distillation loss for the teacher model, the feature-based distillation loss determined based on the features of the student and teacher models;

determining to skip updating the student model using a prediction-based distillation loss for the teacher model, the prediction-based distillation loss determined based on the predictions of the student and teacher models; and updating the student model using the student output data and ground truth data for the image.

13. The system of claim 12, wherein the operations further comprise:

providing, to the teacher model in a knowledge distillation training system, third data representing a second image to cause the teacher model to generate second teacher output data, the second teacher output data comprising (i) second features of the teacher model and (ii) second predictions that indicate whether the second image depicts an object of interest;

providing, to the student model in the knowledge distillation training system, fourth data representing the second image to cause the student model to generate second student output data, the second student output data comprising (i) second features of the student model and (ii) second predictions that indicate whether the second image depicts an object of interest;

determining whether a second accuracy of the second teacher output data satisfies the accuracy threshold; and in response to determining that the second accuracy of the second teacher output data satisfies the accuracy threshold, updating the student model using the second student output data, second ground truth data for the second image, a second prediction-based distillation loss, and a second feature-based distillation loss, wherein the second prediction-based distillation loss is determined based on the second predictions of the student and teacher models, and the second feature-based distillation loss is determined based on the second features of the student and the teacher model.

14. The system of claim 12, wherein:

the features of the teacher output data comprises data that represents each of a plurality of bounding boxes;

determining whether the accuracy of the teacher output data satisfies the accuracy threshold comprises determining, for each of the plurality of bounding boxes, whether a corresponding accuracy of a corresponding portion of the features of the teacher output data that represents the bounding box satisfies the accuracy threshold; and determining to skip updating the student model comprises determining, for the bounding boxes from the plurality of bounding boxes that have the corresponding accuracy that does not satisfy the accuracy threshold, to skip updating the student model using a corresponding distillation loss for the bounding box.

15. The system of claim 12, wherein the operations further comprise determining the accuracy of the teacher output data using the ground truth data for the image and teacher output data.

16. The system of claim 12, wherein the features of the teacher output data and the student output data comprise predicted labels and bounding box locations.

17. The system of claim 12, wherein updating the student model using the student output data and ground truth data for the image comprises: determining a cross entropy loss using the ground truth and the student output data; and updating the student model using the cross entropy loss.

18. The system of claim 12, wherein the first data and second data comprise different data.

19. The system of claim 12, wherein the teacher model and the student model are object detection models.

20. One or more non-transitory computer storage media encoded with instructions that, when executed by one or more computers, cause the one or more computers to perform operations comprising:

providing, to a teacher model in a knowledge distillation training system, first data representing an image to cause the teacher model to generate teacher output data, the teacher output data comprising (i) features of the teacher model and (ii) predictions that indicate whether the image depicts an object of interest;

providing, to a student model in the knowledge distillation training system, second data representing the image to cause the student model to generate student output data, the student output data comprising (i) features of the student model and (ii) predictions that indicate whether the image depicts an object of interest;

determining whether an accuracy of the teacher output data satisfies an accuracy threshold; and in response to determining that the accuracy of the teacher output data does not satisfy the accuracy threshold:

determining to skip updating the student model using a feature-based distillation loss for the teacher model, the feature-based distillation loss determined based on the features of the student and teacher models; and updating the student model using the student output data and ground truth data for the image.

\* \* \* \* \*